Jan. 30, 1923.
J. LEDWINKA.
CHANNEL STRUCTURE FOR TONNEAU PANELS.
FILED FEB. 27, 1919.
1,443,482.
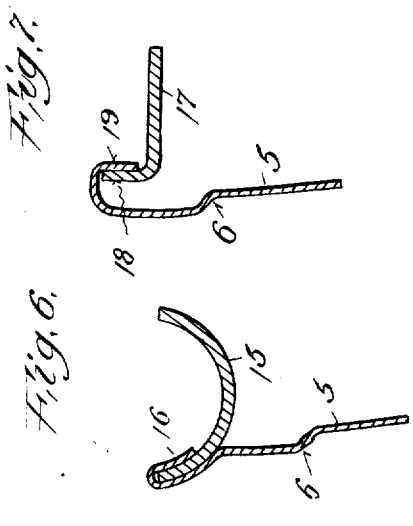
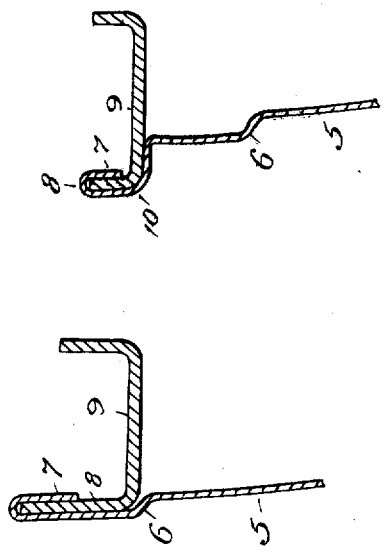
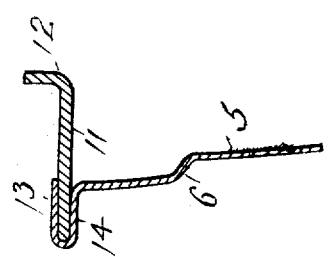
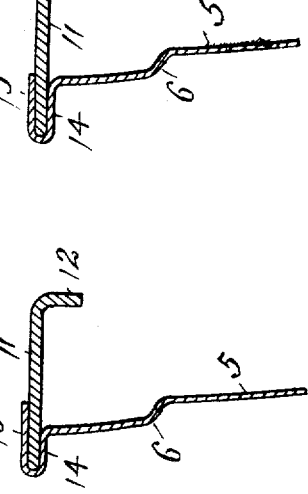
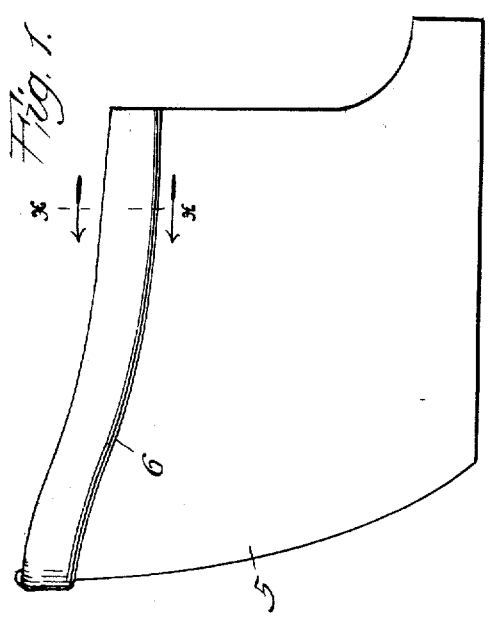
Inventor
Joseph Ledwinka Patented Jan. 30, 1923.

1,443,482

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

CHANNEL STRUCTURE FOR TONNEAU PANELS.

Application filed February 27, 1919. Serial No. 279,591.

*To all whom it may concern:*

Be it known that I, JOSEPH LEDWINKA, a citizen of the United States, residing at Philadelphia, in the county of Philadelphia, State of Pennsylvania, have made a certain new and useful invention in Channel Structures for Tonneau Panels (Case D), of which the following is a specification.

This invention relates to channel structures for tonneau panels, and particularly to the structure for channels employed at the upper edge of a tonneau or seat back panel for automobiles.

The object of the invention is to provide a channel structure for the upper edge of a tonneau or seat back panel which is strong and durable, neat and sightly and affords a distinctive finish for such upper edge, and at the same time forming a convenient means for the application and attachment of the upholstery to the panel.

Further objects of the invention will appear more fully hereinafter.

The invention consists substantially in the construction, combination, location, and relative arangement of parts, all as will be more fully hereinafter set forth, as shown in the accompanying drawing, and finally pointed out in the appended claims.

Fig. 1 is a view in side elevation of an automobile tonneau or seat back panel having a channel structure applied thereto in accordance with my invention.

Fig. 2 is a broken view in vertical section through the upper edge of the panel on the line X, X, Fig. 1.

Figs. 3, 4, 5, 6 and 7, are views similar to Fig. 2 showing modified channel structures embodying my invention.

In the drawing reference numeral 5 designates a tonneau or seat back panel for automobiles. This panel may be of any suitable material, and may be bent or stamped to any desired shape, style or outline. A sheet steel panel well serves the purpose. At its upper edge the panel 5 is bent or offset outwardly as indicated at 6. A channel member is applied in accordance with my invention to the upper edge of the panel. This channel member may be of various shapes or designs and may be applied in various ways to the upper edge of the panel within the spirit and scope of my invention.

In Fig. 2 I have shown the upper edge 7 of the panel bent or folded over inwardly upon itself to receive within the fold thereof one edge 8 of a channel member 9 in the form of a stamping of substantially U-shape in cross section, said edge 8 being received in the seat formed by the offset portion 6 of the panel and on the interior surface thereof. The edge 7, as above explained, is folded inwardly over the edge 8 of the channel member. In this case the channel or open side of the channel member 9 faces upwardly but is disposed below the extreme upper edge of the panel and affords a seat in which the upper portion of the upholstery or cushion may be received.

In the arrangement shown in Fig. 3 the upper edge of the panel, in addition to the offset portion 6 thereof, is formed with a further offset portion 10 above the offset 6, thereby forming a partial seating for the base of the U-shaped channel member 9. In other respects the structure shown in Fig. 3 is substantially the same as that of Fig. 2.

In the arrangement shown in Fig. 4 in place of a channel member of U-shape in cross section the member 11 is employed having one edge thereof bent or turned angularly and presenting downwardly, as indicated at 12, the other edge being received within a fold formed by bending over the edge portion 13 of the panel above the offset 6 therein. In this case the portion 13 is first bent laterally outwardly from the offset portion 6 as indicated at 14 and then over inwardly to form a fold within which the edge of the member 11 is received, said edge of member 11 and the folds 13, 14 being suitably secured together by welding or otherwise. In this case the channel in which the upper edge of the upholstery is received is an inverted channel. The outward and lateral extension formed by the portions 14, 13, in the upper edge of the panel constitutes a smooth and sightly finish for the upper edge of the tonneau.

The structure shown in Fig. 5 is identical with that shown in Fig. 4 except that the bent or angle portion 12 of member 11 faces upwardly instead of downwardly. In this case the cushion or upholstery connection is made in the upwardly facing channel.

In the arrangement shown in Fig. 6 a channel member 15 of cylindrical shape in cross section is employed, one edge thereof being received and fastened within the fold formed by bending the edge 16 of the panel above the offset 6 over and inwardly and downwardly upon itself. In this case the open channel in which the upholstery or cushion is received faces upwardly.

In the arrangement shown in Fig. 7 a member 17 is employed similar to member 11 of the structures shown in Figs. 4 and 5 except that the angle portion 18 at one edge thereof is engaged inside a folded over flange 19 at the upper edge of the panel, the two flanges 18, 19 being secured together by welding or otherwise.

From the foregoing description it will be seen that I provide an exceedingly simple structure, economical to manufacture for the channel rim at the upper edge of a tonneau or seat back panel which may be easily applied and which efficiently accomplishes the purposes of affording a convenient seating for the upper portion of the cushion or upholstery and at the same time affording a neat and sightly appearance.

What I claim as new and useful and of my own invention and desire to secure by Letters Patent is:—

1. The combination with a sheet metal panel bent or stamped into the shape and curvature to form the sides and back of a tonneau or seat, and having the upper edge thereof folded over upon itself, of an upholstery attaching member longitudinally curved to conform to the curvature of the panel and having one edge thereof received and secured within the fold of said flange.

2. The combination with a sheet metal panel bent or stamped into the shape and curvature to form the sides and back of a tonneau or seat, and having an outwardly offset portion at the upper edge thereof, and terminating in a flange bent or turned over upon itself, of an upholstery attaching member longitudinally curved to conform to the curvature of the panel, and having one edge thereof received within the fold of said flange portion.

3. The combination with a sheet metal panel bent or stamped into the shape and curvature to form the sides and back of a tonneau or seat, and having a flange at its upper edge bent or folded inwardly over upon itself, of a channel shaped upholstery attaching member longitudinally curved to conform to the curvature of the panel, and having one edge thereof received and secured within the fold of said flange, the channel of said member being disposed below the extreme upper edge of the folded flange portion of the panel.

4. The combination with a sheet metal panel bent or stamped into the shape and curvature to form the sides and back of a tonneau or seat, and having a flange at its upper edge bent or folded inwardly over upon itself, of a channel shaped upholstery attaching member longitudinally curved to conform to the curvature of the panel and having one edge thereof received and secured within the fold of said flange, the channel of said member being disposed below the extreme upper edge of the folded flange portion of the panel and presenting upwardly.

5. The combination with a sheet metal panel bent or stamped into the shape and curvature to form the sides and back of a tonneau or seat, and having its upper edge bent laterally outwardly and thence over and inwardly upon itself, of an upholstery attaching member longitudinally curved to conform to the curvature of the panel and having one edge thereof received within the fold of said flange and seating upon the surface of the outer lateral bend thereof.

In testimony whereof I have hereunto set my hand on this 24th day of February A. D., 1919.

JOSEPH LEDWINKA.